United States Patent
Suresh (10) Patent No.: US 11,218,567 B2
(45) Date of Patent: Jan. 4, 2022

(54) SERVER RECOMMENDATIONS FOR BROADCASTED SERVICES

(71) Applicant: Hewlett Packard Enterprise Development LP, Houston, TX (US)

(72) Inventor: Swetha Nandyalam Suresh, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 373 days.

(21) Appl. No.: 16/195,907

(22) Filed: Nov. 20, 2018

(65) Prior Publication Data

US 2020/0162580 A1    May 21, 2020

(51) Int. Cl.
*H04L 29/08* (2006.01)
*G06N 20/00* (2019.01)
*H04L 29/06* (2006.01)

(52) U.S. Cl.
CPC .......... *H04L 67/322* (2013.01); *G06N 20/00* (2019.01); *H04L 67/16* (2013.01); *H04L 67/327* (2013.01); *H04L 67/42* (2013.01)

(58) Field of Classification Search
CPC ..... H04L 67/322; H04L 67/327; H04L 67/16; G06N 20/00
See application file for complete search history.

(56) References Cited

U.S. PATENT DOCUMENTS

| | | | |
|---|---|---|---|
| 2007/0224975 A1* | 9/2007 | Jendbro | ............ H04L 29/12066 455/414.1 |
| 2011/0182205 A1 | 7/2011 | Gerdes et al. | |
| 2012/0102408 A1* | 4/2012 | Zhao | ......................... G06F 8/38 715/738 |
| 2015/0134653 A1 | 5/2015 | Bayer et al. | |
| 2015/0142968 A1 | 5/2015 | Bhagwat et al. | |
| 2015/0163635 A1* | 6/2015 | Leppanen | ............... H04W 4/21 455/426.1 |
| 2016/0019636 A1* | 1/2016 | Adapalli | ................. H04L 47/70 705/26.62 |
| 2016/0021214 A1* | 1/2016 | Unnimadhavan | ....... H04L 67/16 709/217 |
| 2016/0021485 A1 | 1/2016 | Sallas et al. | |
| 2016/0119186 A1* | 4/2016 | Xu | ...................... H04L 41/0806 709/220 |

(Continued)

OTHER PUBLICATIONS

Raschka, Sebastian, "Machine Learning FAQ", Mar. 19, 2016, The Wayback Machine, https://web.archive.org/web/20160319120422/https://sebastianraschka.com/faq/docs/feature_sele_categories.html. (Year: 2016).*

(Continued)

*Primary Examiner* — Nam T Tran (74) *Attorney, Agent, or Firm* — Hewlett Packard Enterprise Patent Department (57) ABSTRACT

Example approaches for providing recommendations for connecting to servers are described. In an example, a category, from a plurality of categories, is identified for each of a plurality of servers providing a respective service. each server is grouped under the category identified for the respective server. The category indicates a recommendation for connecting to servers grouped under the category. The category is associated with a service, from a plurality of services, provided by the respective server.

15 Claims, 7 Drawing Sheets

(56) References Cited

U.S. PATENT DOCUMENTS

2017/0374159 A1* 12/2017 Kunde .................... H04L 67/10

OTHER PUBLICATIONS

Lee, Joel, "IP and MAC Address: What Are They Good For?", Nov. 8, 2017, The Wayback Machine, https://web.archive.org/web/20170811145014/https://www.makeuseof.com/tag/ip-mac-address/. (Year: 2017).*
Young, T., Airtame—Network Integration & Setup, (Web Page), Retrieved Nov. 4, 2018, 6 Pgs.

* cited by examiner

Fig. 7 ial attributes. The network manager receives the set of client device interaction attributes and the set of server avail-

SERVER RECOMMENDATIONS FOR BROADCASTED SERVICES

BACKGROUND

In a network environment, such as a Wireless Local Area network (WLAN), servers may broadcast services for being accessed by client devices. A WLAN may include access points (APs) which enable wireless client devices to connect to a network, such as the internet and/or a closed WLAN like a home Wi-Fi network or an office Wi-Fi network, to access the broadcasted services. The APs connect to client devices within the WLAN and may also act as a point of interconnection between the client devices and the severs. Each AP can serve multiple client devices within a defined network area.

BRIEF DESCRIPTION OF DRAWINGS

The following detailed description references the drawings, wherein.

DETAILED DESCRIPTION

In a network environment, servers may broadcast their services over zero-configuration based protocols, such as a multicast Domain Name System (mDNS) protocol. In a WLAN, a client device may send an Internet Protocol (IP) multicast query message requesting a specific service broadcasted by servers in the WLAN. Servers broadcasting the specific service may respond with a multicast response message providing information about the specific service and identity information of the servers broadcasting the specific service. Other client devices may also receive the multicast response message and store the information provided by the servers in respective mDNS caches.

Client devices and servers in a WLAN network may be grouped in multiple subnetworks, such as multiple Virtual Local Area Networks (VLANs). Each subnetwork may include one or more Access points (APs). Each AP may have capabilities to store the information shared by the servers in multicast response messages. The APs may exchange, among themselves, the information shared by the servers in the multicast response messages. The APs may maintain a cache to store and update the information shared by the servers through the multicast response messages. Since updated information about services broadcasted by the servers and the identity information of the servers are stored in an AP, the AP may act as a proxy server between the client devices and the servers providing the services. Thus, the AP may enable service discovery, address assignment, and hostname resolution, and the client devices may connect to the servers via the AP. The APs may also enable a client device grouped in one VLAN to access servers grouped in a different VLAN. The services that may be accessed by the client devices through the zero-configuration based protocols include services like wireless streaming of multimedia content, remote login and remote management of smart devices, file sharing, video on demand, and wireless printing over the WLAN.

When a client device requests for a specific service, information relating to identities and capabilities all servers broadcasting the specific service is provided to the client device by an AP to which the client device is connected. The client device generally processes the information received from the AP and populates such information in a list of servers providing the specific service. With increase in the number of servers providing the specific service, the information to be processed and populated by the client device may increase, thereby resulting in increased consumption of processing resources of the client device. Further, generally a user of the client device browses through the list of servers, to select and connect with a specific server providing the specific service. It may be cumbersome for the user to browse through the list of servers, with increase in the number of servers providing the specific service.

The present disclosure describes approaches in which servers are grouped in respective categories identified for the servers and information related to the categories is transmitted to client devices. Since, a client device receives information of servers grouped in categories, a client device may selectively process information of a list of servers grouped under a particular category which may reduce the information processed by the client device to populate the list of servers grouped under the particular category, thereby reducing processing resource consumption of the client device. Further, this may enhance user convenience to browse through servers grouped under categories which indicate recommendations for connecting to the servers.

The present disclosure describes example implementations of providing recommendations for connecting to servers broadcasting services. In an example, a network environment is described. The network environment includes a computer network infrastructure that enables communication between devices in the network environment. The network environment may be a public network or a private network or the internet. Examples of the network environment include a WLAN, Wide Area Network (WAN), and Metropolitan Area Network (MAN). The network environment includes server(s), client device(s), and network device(s). A network device has capabilities of service discovery, address assignment, and hostname resolution and may enable the client devices to connect to the servers. The network environment includes a network manager. The network manager is capable of wireless and/or wired network management for the network device, such as an AP, a switch, and a gateway. The network manager has capabilities to control, configure and monitor health and usage of network devices in the network environment through software-defined Wide Area network (SD-WAN) management technologies. In an example, the network manager includes software-defined cloud-based network management capabilities.

In an example, the network manager receives a set of client device interaction attributes and a set of server availability attributes from a network device in the network environment. The set of client interaction attributes are indicative of a correlation between a client device, a service requested by the client device from a plurality of services, and a server, from a plurality of servers, which broadcasts the requested service. The set of server availability attributes is indicative of an operational state of each of the plurality of servers. The operational state indicates the capability of a server to perform its functions of connecting to client devices and providing services requested by the client devices. Operational state of a server refers to availability of the server over the network to provide a respective service. In an example, the server may have an operational state as "online". When the operational state of the server is "online", it may be understood that the server is available to provide the respective service. In an example, the server may have an operational state as "offline". When the operational state of the server is "offline", it may be understood that the server is unavailable to provide the respective service. Further, in an example, the server availability attributes may include information related to identity of servers for which the operational state is "online" and information related to identity of servers in the "offline" operational state is excluded from the server availability attributes.

A first subset of attributes is selected from the set of client interaction attributes and a second subset of attributes is selected from the set of server availability attributes. Based on at least one of the first subset of attributes and the second subset of attributes, a category, from a plurality of categories, is identified for each of the plurality of servers. The category is associated with the service provided by a respective server. The plurality of categories is indicative of recommendations for connecting to the plurality of servers. Each server is grouped under the category identified for the respective server and information related to the plurality of categories is transmitted to client devices in the network environment. in an example, the information related to the categories may be provided to the client devices in the form of recommendation information for connecting to the servers.

The client device may receive the recommendation information related to the plurality of categories from the network manager. The client device may generate a list of the plurality of services and may receive a first input from a user selecting a service, from the plurality of services. After receiving the first input, the client device generates a list of the plurality of categories associated with the selected service based on the recommendation information. Each of the plurality of categories are selectable by the user to generate a list of servers grouped under the selected category.

Since, the categories are indicative of recommendations for connecting to the servers, it may be convenient for a user to browse through the list of servers grouped under respective categories to select and connect with a specific server providing the selected service. Further, as the servers providing the selected service are grouped in categories, a list of servers grouped under each category may be easily processed and thereby may help to reduce processing resource consumption of the client device.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
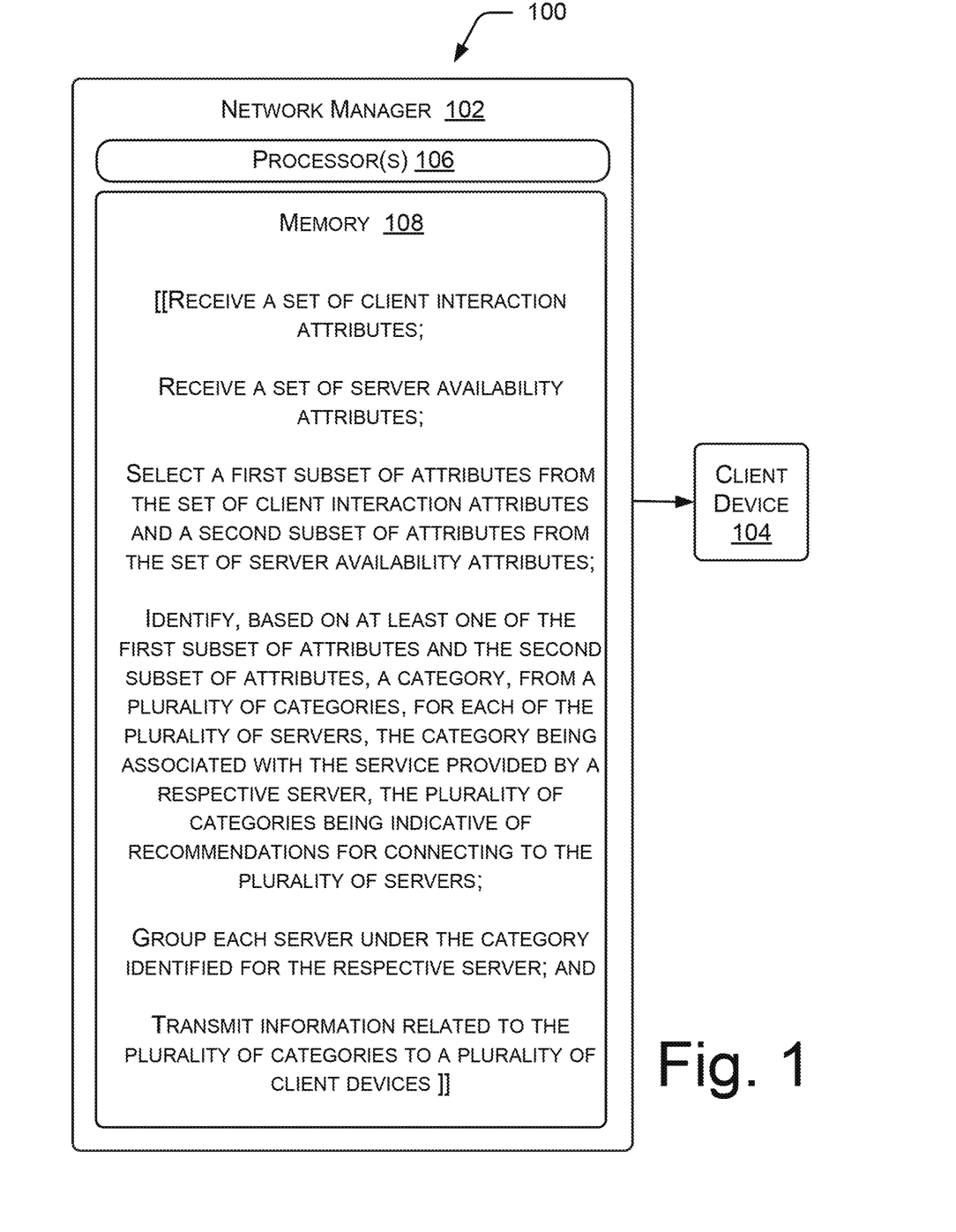
FIG. 1 illustrates a network environment for providing recommendations for connecting to servers broadcasting services, according to an example.

FIG. 1 illustrates a network environment 100 for providing recommendations for connecting to servers broadcasting services, according to an example. The network environment 100 may include a Local Area Network (LAN), a MAN, a Campus Area Network (CAN), a WAN, or a combination thereof. In an example, the network environment 100 may be a private network, such as an intranet or may be connected to a larger network, such as the internet.

The network environment 100 includes a network manager 102. The network manager 102 has capabilities to control, configure and monitor health and usage of devices (not shown in FIG. 1) in the network environment 100 through software-defined network management technologies. Although, in FIG. 1, the network manager 102 is illustrated as a single entity, in an example, the network manager may be implemented in a distributed computing architecture and may be spread across a cluster of nodes which provide processing resource and storage resource for network management. In an example, the network manager 102 may be implemented on a cloud-based network infrastructure, where the network manager may be spread across a shared pools of computing resources connected over the internet.

The network environment also includes a plurality of servers (not shown in FIG. 1) each providing a respective service. The services may be broadcasted over zero configuration networking protocols, such as mDNS and Universal Plug and Play (UPnP) protocols of the Digital Living Network Alliance (DLNA). Examples of the services comprises wireless streaming of multimedia content, remote login and remote management of devices, file sharing, video on demand, and wireless printing.

The network environment 100 also includes network devices (not shown in FIG. 1). The network devices have capabilities of service discovery, address assignment, and hostname resolution and may enable client devices to connect to servers in the network environment 100. Examples of a network device include an AP, a switch, and a gateway. The network devices may be managed by the network manager 102.

The network environment 100 also includes a client device 104. The client device 104 may communicate with the plurality of servers to access services broadcasted by the servers. Although a single client device is shown in FIG. 1, the network environment 100 may include multiple client devices. The network manager 102 can connect to the client devices through a LAN, MAN, CAN, WAN, or the internet. Examples of the client device 104 include a laptop, a smartphone, a smart television, and a handheld device.

The network manager 102 includes a processor 106 and a memory 108 coupled to the processor 106. The memory 108 stores instructions executable by the processor 106. The instructions when executed by the processor 106 cause the processor 106 to receive a set of client interaction attributes from a network device (not shown in FIG. 1) in the network environment 100. The set of client interaction attributes is indicative of a correlation between a client, a service requested by the client device from the plurality of services, and a server, from the plurality of servers, which broadcasts the requested service.

Further, the instructions when executed by the processor 106 cause the processor 106 to receive a set of server availability attributes from the network device. The set of server availability attributes are indicative of an operational state of each of the plurality of servers.

Further, the instructions when executed by the processor 106 cause the processor 106 to select a first subset of attributes from the set of client interaction attributes and a second subset of attributes from the set of server availability attributes. In an example, the first subset of attributes and the second subset of attributes may be predefined which may be used for selection. In another example, the first subset of attributes and the second subset of attributes may be selected using machine learning (ML) based feature selection techniques which enable selecting a subset of features (variables and predictors) for constructing a training model. In an example, wrapper-based ML techniques may be used for selecting the first subset of attributes and the second subset of attributes. In an example, the first subset of attributes includes Media Access Control (MAC) addresses of a client device requesting a service and a server providing the service, Internet Protocol (IP) addresses of the client device and the server, service name of the requested service, an identification tag of the requested service, name of an access point to which the client device is connected, and name of an access point to which the server is connected. In an example, the second subset of attributes comprises MAC address and IP address of a server which is online, service name of a service broadcasted by the server, identification tag of the service, and name of an AP to which the server is connected.

The instructions stored in the memory 108 are executable by the processor 106 to further identify based on at least one of the first subset of attributes and the second subset of attributes, a category, from a plurality of categories, for each of the plurality of servers. The category is associated with the service provided by a respective server. The plurality of categories is indicative of recommendations for connecting to the plurality of servers.

Further, the instructions when executed by the processor 106 cause the processor 106 to group each server under the category identified for the respective server and transmit information related to the plurality of categories to client devices in the network environment 100.

Since, according to the present disclosure, the servers are grouped in categories, processing resource consumption in processing and populating the categorically grouped list of servers may be reduced and thereby may result in faster operation of the client devices. Further, it may also enhance user experience in browsing and selecting a server from a category, based on the recommendation indicated by the category.

Figure 2:
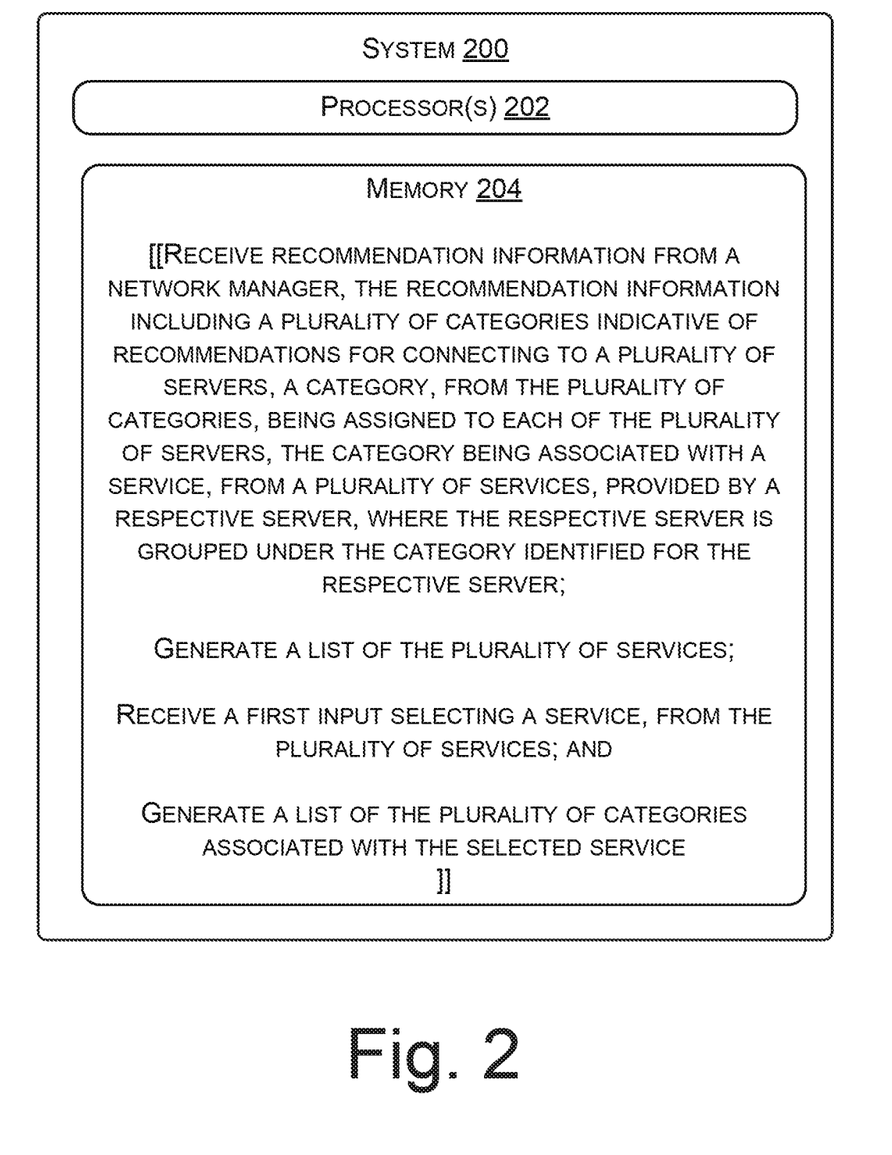
FIG. 2 illustrates a system for receiving recommendations for connecting to servers broadcasting services, according to an example.

FIG. 2 illustrates a system 200 for receiving recommendations for connecting to servers broadcasting services, according to an example. In an example, the system 200 may be a client device, such as the client device 104 and may communicate with a network manager, such as the network manager 102. The system 200 may also communicate with an AP and access services provided by servers over a network via the AP. Examples of the system 200 include a laptop, a smartphone, a smart television, and a handheld device.

The system 200 includes a processor 202 and a memory 204 coupled to the processor 202. The memory 204 stores instructions executable by the processor 202. The instructions when executed by the processor 202 cause the processor 202 to receive recommendation information from a network manager, such as the network manager 102. The recommendation information includes a plurality of categories indicative of recommendations for connecting to a plurality of servers. A category, from the plurality of categories, is identified for each of the plurality of servers. The category is associated with a service, from a plurality of services, broadcasted by a respective server. Each server is grouped under the category identified for the respective server. In an example, the recommendation information may include lists of servers grouped under categories identified for the servers.

The instructions when executed by the processor 202 cause the processor 202 to generate a list of the plurality of services and to receive a user input selecting a service, from the plurality of services. After the user input selecting a service is received, the instructions are executable by the processor 202 to generate a list of the plurality of categories associated with the selected service.

Figure 3:
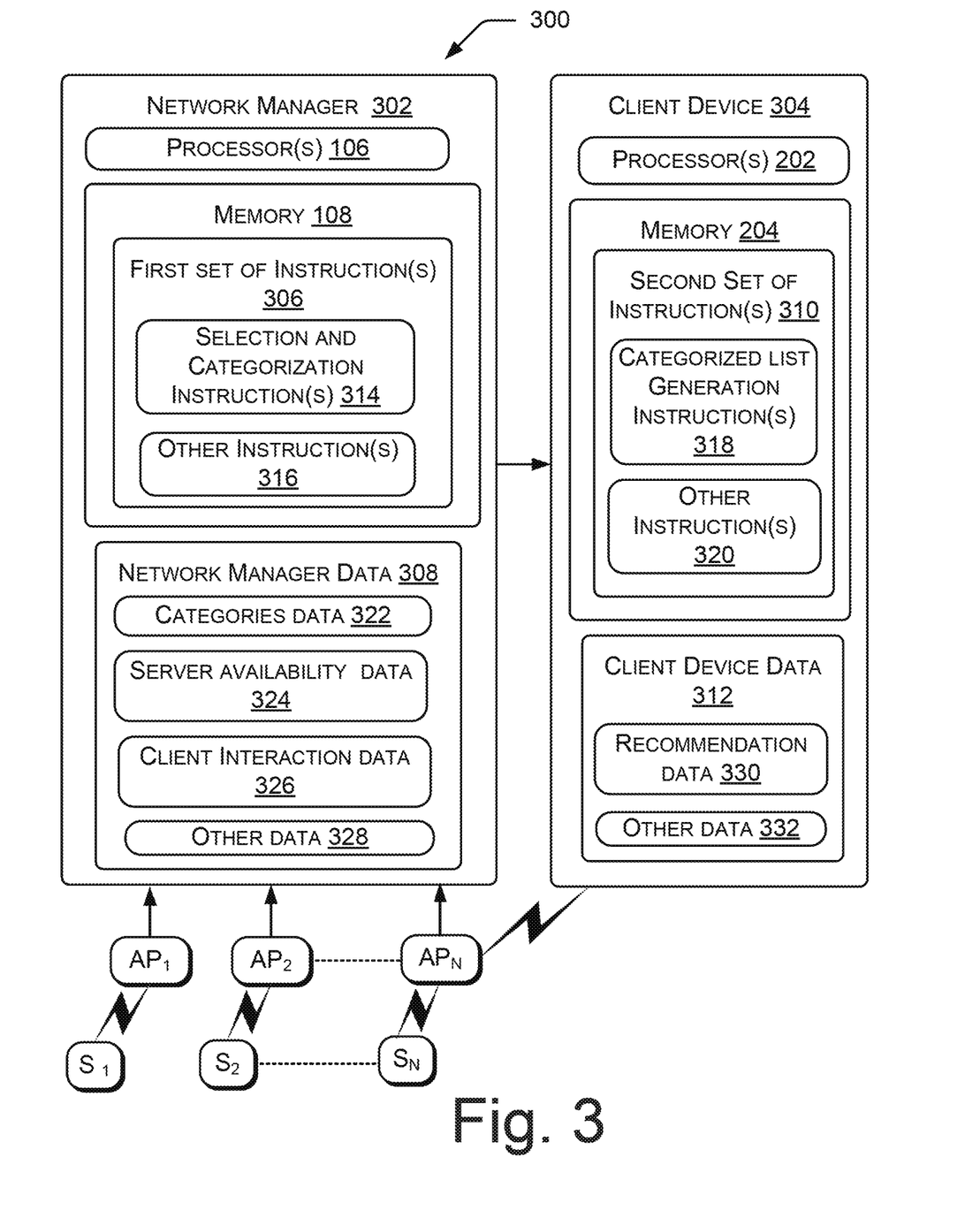
FIG. 3 illustrates a network environment, according to an example.

FIG. 3 illustrates a network environment 300, according to an example. The network environment 300 includes a network manager 302 similar to the network manager 102. In an example, the network manager 302 may be implemented in a single computing entity or in a distributed computing architecture or in a cloud-based infrastructure. The network manager 302 may use software-defined network management technologies.

The network environment 300 also includes a client device 304 similar to the system 200. The network manager 302 may connect to the client device through a private network or the internet. Examples of the client device 304 include a smartphone, a laptop, and a handheld device. Although, a single client device 304 is shown in FIG. 3, in an example, there may be multiple client devices in the network environment.

The network environment 300 includes servers, $S_1$, $S_2$, ..., $S_N$, collectively referred to as servers S. The servers refer to computing systems or applications running in a host system than can provide a service or more than one services to devices requesting for such services. In an example, the servers are configured to perform specific functions to provide specific services. The servers S may be grouped into different subnetworks. A subnetwork may be a logical division of a computer network, in which all nodes can communicate with each other. In an example, a subnetwork may be a VLAN in the context of layer 2 of the Open Systems Interconnection (OSI) model or an IP subnet in the context of layer 3 of the OSI model. Also, consider that server $S_1$ broadcasts service $Sr_1$, server $S_2$ broadcasts service $Sr_2$, and server $S_N$ broadcasts service $Sr_N$ over the network environment 300.

The network environment 300 includes access points, $AP_1$, $AP_2$, ..., $AP_N$ collectively referred to as access points (APs). The APs may be connected over a LAN. In an example, the APs may be wireless access points and may communicate with the servers S over a Wireless Local Area Network (WLAN). In FIG. 2, although server $S_1$ is shown to be connected to access point AP1, server $S_2$ is shown to be connected to access point $AP_2$, and server $S_3$ is shown to be connected to access point $AP_3$, however, any server may connect to any access point based on network topology and network administrator configurations. Further, although in FIG. 2, one server is shown to be connected to each of the APs, in an example, more than one server may also connect to an AP. In FIG. 2, access point $AP_N$ is in communication with the client device 304. In an example, the client device 304 may communicate with the access point $AP_N$ over a WLAN.

The network manager 302 includes a processor 106 coupled to a memory 108. The client device 304 includes the processor 202 and the memory 204. The processor(s) 106 and 202 may be implemented as microprocessors, microcomputers, microcontrollers, digital signal processors, central processing units, state machines, logic circuitries, and any devices that manipulate signals based on operational instructions. Among other capabilities, the processor(s) 106 and 202 are configured to fetch and execute computer-readable instructions stored in the memories 108 and 204, respectively. The computer-readable instructions, also referred to as instructions, includes a first set of instruction(s) 306 and a second set of instruction(s) 310. The first set of instructions(s) 306 and second set of instruction(s) 310 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 3, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other custom-built hardware, may also be included.

The memories 108 and 204 may include any computer-readable medium known in the art including, for example, volatile memory (e.g., RAM), and/or non-volatile memory (e.g., EPROM, flash memory, etc.). The first set of instruction(s) 306 and network manager data 308 may reside in the memory 108. The second set of instruction(s) 310 and client device data 312 may reside in the memory 204.

The first set of instruction(s) 306 include selection and categorization instruction(s) 314 which corresponds to instructions stored on a computer-readable medium and executable by a processor to select subsets of attributes, identify a category for a sever, and group the server under the identified category. The first set of instruction(s) 306 also comprise other instruction(s) 316 that supplement applications on the network manager 302, for example, execution of functions of an operating system.

The second set of instruction(s) 310 include categorized list generation instruction(s) 318 which corresponds to instructions stored on a computer-readable medium and executable by a processor to generate a list of categories for severs based on recommendation data received from a network manager, such as the network manager 302. The second set of instruction(s) 310 also comprise other instruction(s) 320 that supplement applications on the client device 304, for example, execution of functions of an operating system.

The network manager data 308 serves, amongst other things, as a repository for storing data that may be fetched, processed, received, or generated during execution of the first set of instruction(s) 306 by the processor 106. The network manager data 308 includes categories data 322 which stores data relating to categories identified for servers providing services, server availability data 324 which stores data relating to identities of servers which are in an "online" operational state, and client interaction data 326 which stores data relating to a mapping between a client device, a service requested by the client device, and a server providing the requested service. The network manager data 308 also comprises other data 328 that may be fetched, processed, received, or generated during execution of other instruction(s) 316.

The client device data 312 serves, amongst other things, as a repository for storing data that may be fetched, processed, received, or generated during execution of the second set of instruction(s) 310 by the processor 202. The client device data 312 includes recommendation data 330 which stores data relating to recommendations for connecting to servers S in the network environment 300. The client device data 312 also comprises other data 332 that may be fetched, processed, received, or generated during execution of other instruction(s) 320.

Consider that the client device 304 requests to access a service $Sr_2$ provided by the server $S_2$. The client device 304 may connect to the access point $AP_N$ and send a request for accessing the service $Sr_2$ provided by the server $S_2$. The access point $AP_N$ may forward the request to the access point $AP_2$ to which the server $S_2$ is connected. Thus, a connection may be established between the server $S_2$ and the client device 304 through the access points $AP_2$ and $AP_N$. As the client device 304 connects to the access point $AP_2$, a correlation or mapping may be established between the client device 304, the service $Sr_2$ requested by the client device 304, and the server $S_2$ which broadcasts the requested service. In an example, the correlation may be expressed through a set of client interaction attributes, also referred to as CI attributes. The CI attributes, in this scenario, may include Media Access Control (MAC) addresses of the client device 304 requesting the service $Sr_2$ and the server $S_2$ providing the service $Sr_2$, Internet Protocol (IP) addresses of the client device 304 and the server $S_2$, service name of the service $Sr_2$, an identification tag or service ID of the service $Sr_2$, a name of the access point $AP_N$ to which the client device 304 is connected, a name of the access point $AP_2$ to which the server $S_2$ is connected, a type information about the client device 304 which indicates whether the client device 304 is a wired or wireless device, a host name of the client device 304, a VLAN ID under which the client device 304 is grouped. In an example, the CI attributes may be collected from data packets exchanged between the client device 304 and the access point $AP_N$ and the server $S_2$ and the access point $AP_2$. Although in the present example, the CI attributes are explained in respect of the client device 304, the service $Sr_2$, and the server $S_2$, information exchanged between other client devices in the network environment 300 and other servers may be included in the CI attributes. Over time as more client devices connect to servers more CI attributes may be collected by the APs. In an example, the APs may store the CI attributes in a memory and may periodically update the same.

Further, in an example, the servers S may periodically transmit "keepalive" messages to respective APs indicating that an operational state of the respective server is "online". The operational state indicates the capability of a server to perform its functions of connecting to client devices and providing services requested by the client devices. In the "online" operational state, the servers S are available to be accessed by client devices for providing their respective services. In an example, the keepalive messages sent by the server $S_1$ to the $AP_1$ may include information about identity of the server $S_1$ and information about the service $Sr_1$ provided by the server $S_1$. The servers $S_2, \ldots, S_N$ may also send similar keepalive messages. The information about identity of the server and information about the service provided by the server may be indicated through a set of server availability attributes, also referred to as SA attributes. In an example, the SA attributes are shared by a server, when the operational state of the server is "online". Thus, when a server shares the SA attributes in the "keepalive" messages, it may be deduced that the operational state of the server is "online". Therefore, the SA attributes indicate the operational state of each of the plurality of servers S. The SA attributes may include a MAC address and an IP address of a server which is the "online" operational state, a service name of a service broadcasted by the server, identification tag or service ID of the service, name of an access point to which the server is connected, type information about the server, a host name of the server, a VLAN ID of the VLAN under which the server is grouped, a role of the server, and a group name of the server. In an example, the SA attributes may be stored in the APs and may be periodically updated. The APs may also share the SA attributes among themselves.

In operation, the CI attributes and the SA attributes are received by the network manager 302. In an example, the APs may transmit the CI attributes and the SA attributes to the network manager 302 at regular time intervals. Thus, a database may be maintained in the network manager 302 including the CI attributes and SA attributes.

When executed by the processor 106, the selection and categorization instruction(s) 314 enable selection of a first subset of attributes from the CI attributes and a second subset of attributes from the SA attributes. In an example, the first subset of attributes may be predefined which may be extracted from the CI attributes. The predefined first subset of attributes may include Media Access Control (MAC) addresses of a client device requesting a service and the server providing the service, Internet Protocol (IP) addresses of the client device and the server, service name of the requested service, an identification tag or service ID of the requested service, a name of the access point to which the client device is connected, a name of the access point to which the server is connected.

In an example, the second subset of attributes may be predefined which may be extracted from the SA attributes. The predefined second subset of attributes may include a MAC address and an IP address of a server which is the "online" operational state, a service name of a service broadcasted by the server, identification tag or service ID of the service, name of an access point to which the server is connected.

Further, in an example, for selecting the first and second subset of attributes from the CI attributes and the SA attributes, respectively, the selection and categorization instruction(s) 314 may employ feature selection techniques which include a search operation for proposing new feature subsets, along with an evaluation operation which scores the different feature subsets. The feature selection techniques may test each possible subset of features to find the subset of features which minimizes the error rate. In an example, at least one of a wrapper-based ML technique, a filter-based feature selection technique, and an embedded feature selection technique may be used for selecting the first and second subset of attributes. Selection of the first and second subset of attributes using the wrapper-based ML techniques may enable deduplication and removal of redundancies from the CI attributes and SA attributes. The ML models may be trained using the best performing set approach to arrive at the first and second subset of attributes.

In an example, execution of the selection and categorization instruction(s) 314 may cause the first subset of attributes to be periodically transmitted to an artificial intelligence (AI) engine. In an example, the AI engine may implement a supervised ML model for predictive analytics of the first subset of attributes. Based on predictions of the AI engine, the selection and categorization instruction(s) 314 may enable identification of a first category for a first set of servers, from the plurality of servers S. Each of the first set of servers provide an identical service, such as one of a service $Sr_1, Sr_2, \ldots, Sr_N$. The first category indicates a recommendation for connecting to the first set of servers based on a frequency of usage of the first set of servers. The first set of servers may include servers which frequently connect with client devices for providing the service requested by the client devices. In an example, the first category may represent a category of "Frequently used servers". The AI engine may learn patterns from the first subset of attributes to provide the recommendation of the "Frequently used servers".

Further, based on the second subset of attributes, the selection and categorization instruction(s) 314 may cause a first subset of servers to be identified from the first set of servers. The operational state of the first subset of servers is "online". In an example, the selection and categorization instruction(s) 314 may be executed by the processor 106 for analysis of the second subset of attributes to extract MAC addresses and IP addresses of those servers which consistently provide the SA attributes thereby indicating that those servers are available. Thus, the first subset of servers refers to those servers among the first set of servers which are in an "online" operational state.

The selection and categorization instruction(s) 314 may enable ranking of the first subset of servers based on connectivity tests and network speed tests to obtain a ranked list of the first subset of servers. In an example, the connectivity tests may include ping tests for each of the first subset of servers to determine a latency of a network connection between each of the first subset of servers and respective APs to which each of the first subset of servers are connected. In an example, the network speed tests include a bandwidth test for each of the first subset of servers. Based on the connectivity tests and network speed tests, each of the first subset of servers may be ranked with a server having higher connectivity and network speed being allotted a higher rank as compared to a server having lower connectivity and network speed. In an example, the first subset of servers may be ranked in a list with a server having a higher rank preceding a server having a lower rank in the list. The selection and categorization instruction(s) 314 may enable grouping of the ranked list of the first subset of servers under the first category.

In another example, execution of the selection and categorization instruction(s) 314 by the processor 106 may cause identification of a second category for a second set of servers, from the plurality of servers S, based on the second subset of attributes. The operational state of the second set of servers is "online". Each of the second set of servers provide an identical service, such as one of a service $Sr_1, Sr_2, \ldots, Sr_N$. In an example, the selection and categorization instruction(s) 314 may enable analysis of the second subset of attributes to extract MAC addresses and IP addresses of those servers which consistently provide the SA attributes thereby indicating that those servers are available. Thus, the second set of servers refers to those servers from the plurality of servers S which are in an "online" operational state. Therefore, the second category is indicative of a recommendation for connecting to the second set of servers based on an operational state of the second set of servers. In an example, the second set of servers may be arranged in a ranked list based on connectivity tests and network speed tests. The ranked list of the second set of servers may be grouped under the second category.

In another example, the selection and categorization instruction(s) 314 may cause a hop count to be determined between a client device requesting a service and servers broadcasting the requested service. The hop count refers to a number of intermediate devices through which a data packet passes between a source and a destination. The hop count may indicate a proximity or distance between a client device and a server. In an example, the hop count may refer to the number of intermediate APs, a data packet needs to pass between a client device requesting a service and a server providing the requested service. Based on the hop count, the selection and categorization instruction(s) 314 may enable identification of a third category for a third set of servers. In an example, the third set of servers may be identified as neighboring servers of the client device requesting the service, based on the hop count. Thus, the third category is indicative of a recommendation for connecting to the third set of servers based on a proximity of each of the third set of servers and the client device. Each of the third set of servers provide an identical service, such as one of a service $Sr_1, Sr_2, \ldots, Sr_N$.

Further, based on the second subset of attributes, the selection and categorization instruction(s) 314 may cause identification of a third subset of servers, from the third set of servers. The operational state of the third subset of servers is "online". In an example, the selection and categorization instruction(s) 314 may enable analysis of the second subset of attributes to extract MAC addresses and IP addresses of those servers which consistently provide the SA attributes thereby indicating that those servers are available. Thus, the third subset of servers refers to those servers among the third set of servers which are in an "online" operational state.

The selection and categorization instruction(s) 314 may also enable ranking the third subset of servers based on connectivity tests and network speed tests to obtain a ranked list of the third subset of servers. In an example, the third subset of servers are ranked in a similar manner as that of the first subset of servers. In an example, the third subset of servers may be ranked in a list, with a server having a higher rank preceding a server having a lower rank in the list. The selection and categorization instruction(s) 314 may enable grouping the ranked list of the third subset of servers under the third category.

Thus, each of the servers S may be grouped under a category identified for the respective server. In an example, information related to the plurality of categories is transmitted by the network manager 302 to a plurality of client devices (not shown) in the network environment 300. The plurality of categories includes the first category, the second category, and the third category, as described above. In an example, the information regarding the categories may be provided to the client devices in the form of recommendation information for connecting to the servers S.

Client devices, such as the client device 304, may receive the recommendation information. The recommendation information includes a plurality of categories indicative of recommendations for connecting to the servers S, a category, from the plurality of categories, being identified for each of the plurality of servers S. The category is also associated with a service, from a plurality of services, provided by a respective server. The servers providing a specific service are grouped into the plurality categories indicating recommendations for connecting to the servers providing the specific service.

The categorized list generation instruction(s) 318, when executed by the processor 202, cause the processor 202 to generate a list of the plurality of services, such as $Sr_1, Sr_2, \ldots, Sr_N$ provided by the servers S. In an example, the categorized list generation instruction(s) 318 may cause the list of services to be obtained from the APs. In an example, the list of services may be displayed in a display unit (not shown) of the client device 304. A user may select a service form the list of services through an input/output (I/O) device, such as a mouse or through a touch-based user input provided on a touch-based display unit of the client device 304.

The categorized list generation instructions) 318 may enable a first user input to be received. The first user input may select a service, from the plurality of services $Sr_1, Sr_2, \ldots, Sr_N$. After receiving the first user input, the categorized list generation instruction(s) 318 enables generation of a list of the plurality of categories associated with the selected service. The list of categories in generated based on the recommendation information received from the network manager 302. The plurality of categories includes the first category assigned to the first set of servers, from the plurality of servers S, where the first category is indicative of a recommendation for connecting to the first set of servers based on a frequency of usage of the first set of servers. The plurality of categories includes the second category assigned to the second set of servers, from the plurality of servers S, where the second category is indicative of a recommendation for connecting to the second set of servers based an operational state of the second set of servers. The plurality of categories includes a third category assigned to a third set of servers, from the plurality of servers S, where the third category is indicative of a recommendation for connecting to the third set of servers based on a proximity of each of the third set of servers and a client device.

In an example, the categories may include a fourth category assigned to a predefined server. In an example, a server from the servers S may be predefined by the user as a default server for accessing the service provided by the server. The predefined server may be selected by the user. Thus, the fourth category is indicative of a recommendation for connecting to the predefined server based on a user selection. In an example, the client device 304 after receiving a user selection to access a service may attempt to connect to the predefined server which provides the service. In an example, the fourth category may be referred to as an "Auto-connect" feature.

After the list of categories are generated, the categorized list generation instruction(s) 318 may cause a second user input to be received. The second user input is to select a category, from the plurality of categories, associated with the selected service. On receiving the second user input, the categorized list generation instruction(s) 318 may enable generation of a list of servers grouped under the selected category. The client device 304, may receive a third user input selecting a sever from the list of servers to connect with the server for accessing the selected service.

Figure 4:
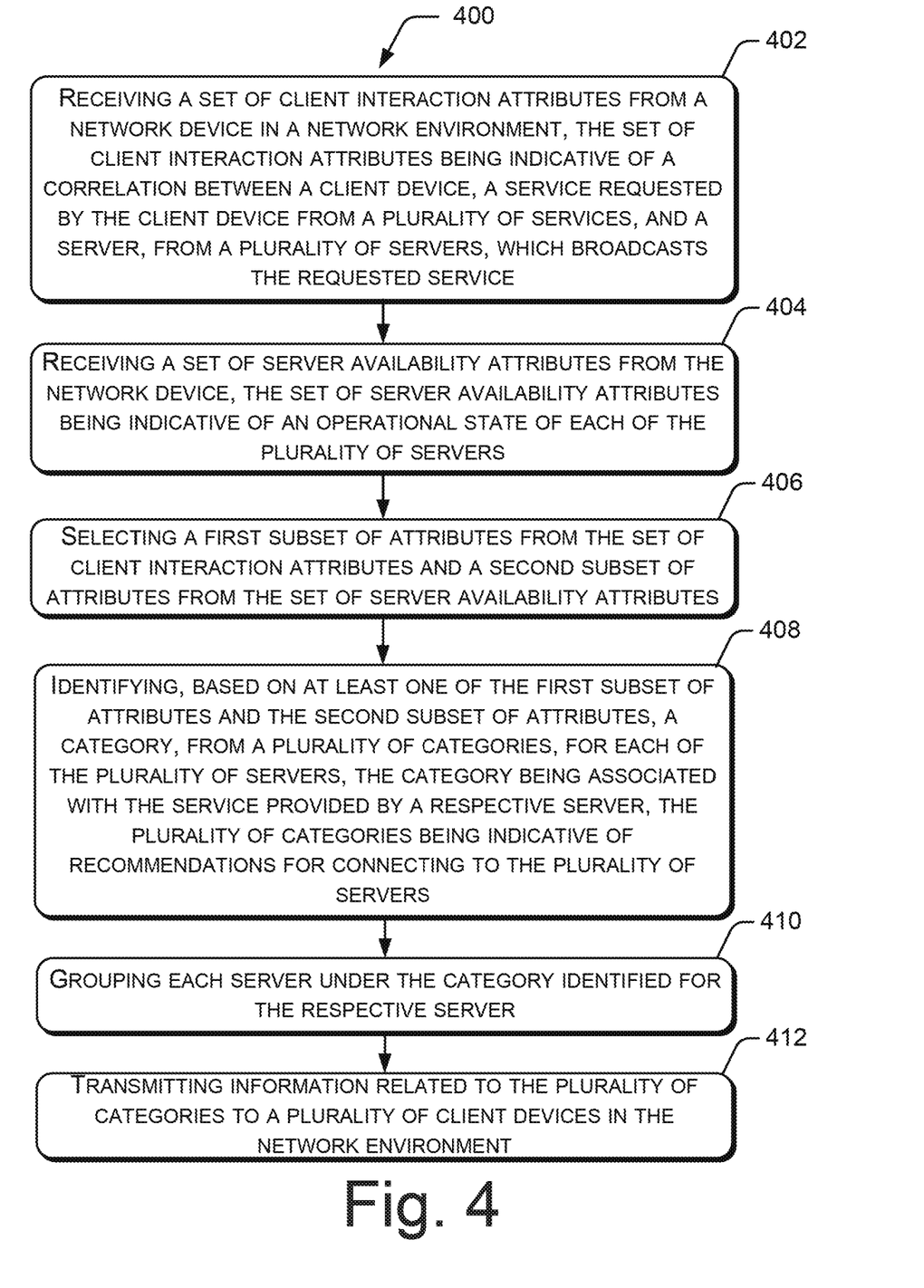
FIG. 4 illustrates a method for providing recommendations for connecting to servers, according to an example.

FIG. 4 illustrates a method 400 for providing recommendation for connecting to servers, according to an example. The method 400 may be executed by a network manager, such as the network manager 102 or 302. The method 400 can be implemented by processing resource(s) or computing device(s) through any suitable hardware, a non-transitory machine readable medium, or combination thereof. In an example, step(s) of the method 400 may be performed by execution of computer-readable instructions, such as the selection and categorization instruction(s) 314, which includes instructions stored on a medium and executable by a processing resource, such as the processor 106, of a network manager, such as the network manager 102 or 302. Further, although the method 400 is described in context of the aforementioned network manager 102 or 302, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 4, at block 402, a set of client interaction attributes are received from a network device in a network environment. In an example, the network device may have capabilities to connect client devices to server devices. Examples of network device includes an AP, a switch, and a gateway. The set of client interaction attributes are indicative of a correlation between a client device, a service requested by the client device from a plurality of services, and a server, from a plurality of servers, which broadcasts the requested service. In an example, the plurality of services is broadcasted over zero configuration networking protocols. Examples of the plurality of services include wireless streaming of multimedia content, remote login and remote management of devices, file sharing, video on demand, and wireless printing.

At block 404, a set of server availability attributes are received from the network device. The set of server availability attributes are indicative of an operational state of each of the plurality of servers. The operational state indicates the capability of a server to perform its functions of connecting to client devices and providing services requested by the client devices.

At block 406, a first subset of attributes is selected from the set of client interaction attributes and a second subset of attributes is selected from the set of server availability attributes. In an example, the first subset of attributes and the second subset of attributes are selected using wrapper-based machine learning techniques.

Examples of the first subset of attributes include Media Access Control (MAC) addresses of a client device requesting a service and a server providing the service, Internet Protocol (IP) addresses of the client device and the server, service name of the requested service, an identification tag of the requested service, name of an access point to which the client device is connected, and name of an access point to which the server is connected.

Examples of the second subset of attributes include MAC address and IP address of a server, from the plurality of servers, which is online, service name of a service broadcasted by the server, identification tag of the service, and name of an access point to which the server is connected.

At block 408, based on at least one of the first subset of attributes and the second subset of attributes, a category, from a plurality of categories, for each of the plurality of servers is identified. The category is associated with the service provided by a respective server. The plurality of categories is indicative of recommendations for connecting to the plurality of servers At block 410, each server is grouped under the category identified for the respective server. At block 412, information related to the plurality of categories is transmitted to a plurality of client devices in the network environment.

Figure 5:
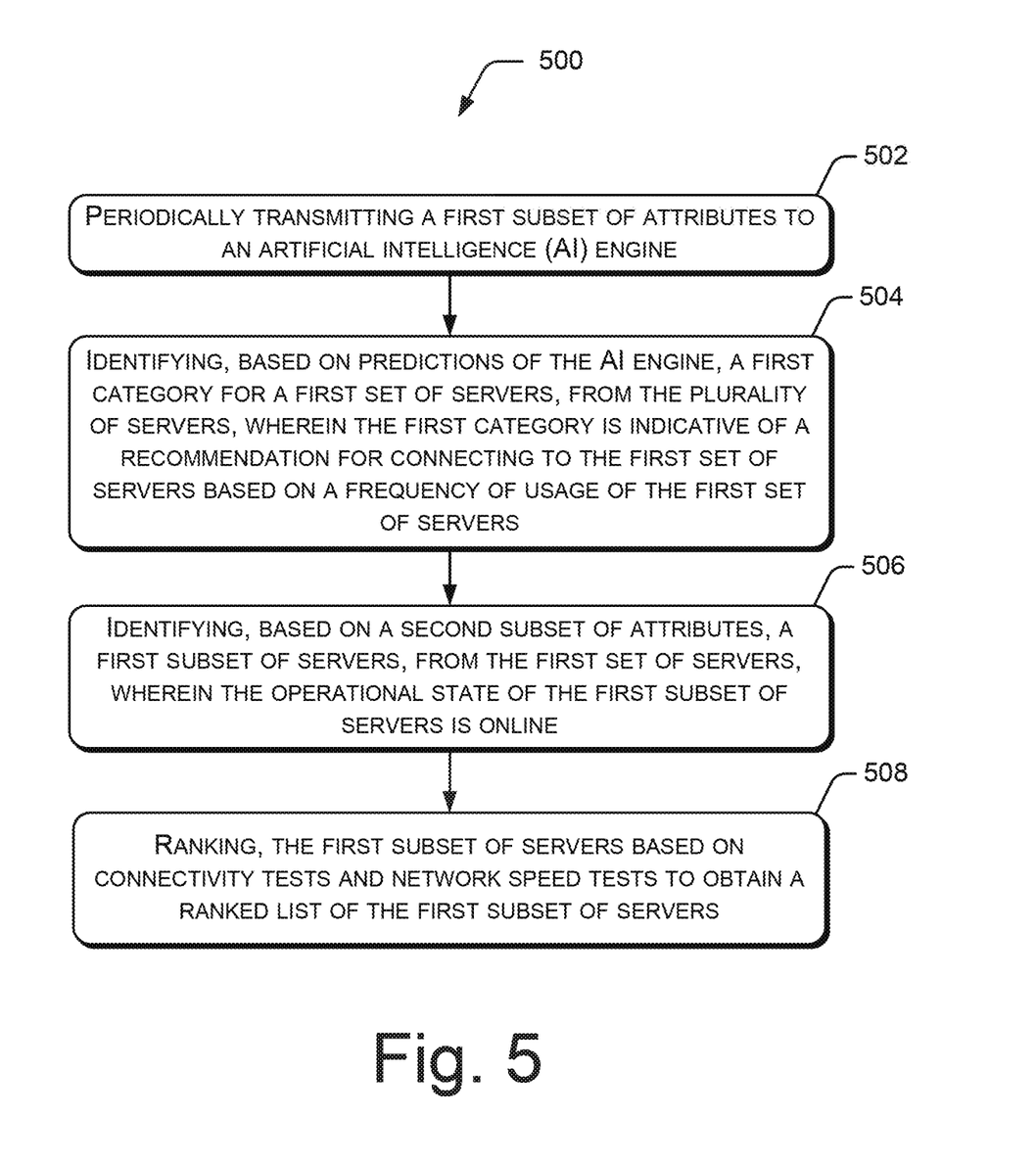
FIG. 5 illustrates a method for identification of a category for a server broadcasting a service, according to an example.

FIG. 5 illustrates a method 500 for identification of a category for a server broadcasting a service, according to an example. In an example, the category is a first category indicative of a recommendation for connecting to a first set of servers based on a frequency of usage of the first set of servers. The method 500 may be executed by a network manager, such as the network manager 102 or 302. The method 500 can be implemented by processing resource(s) or computing device(s) through any suitable hardware, a non-transitory machine readable medium, or combination thereof. In an example, the method 500 may be performed by computer-readable instructions, such as the selection and categorization instruction(s) 314 which includes instructions stored on a medium and executable by a processing resource, such as the processor 106, of a network manager, such as the network manager 102 or 302. Further, although the method 500 is described in context of the aforementioned network manager 102 or 302, other suitable systems may be used for execution of the method 500. It may be understood that processes involved in the method 500 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 5, at block 502, a first subset of attributes selected from the client interaction attributes are periodically transmitted to an artificial intelligence (AI) engine. In an example, the AI engine may employ supervised ML models to predict patterns from the first subset of attributes. At block 504, based on predictions of the AI engine, a first category for a first set of servers, from the plurality of servers, is identified. The first set of servers include servers which frequently connect with client devices for providing the respective service. In an example, the first category may represent a category of "Frequently used servers".

At block 506, a first subset of servers, from the first set of servers, are identified, based on the second subset of attributes. The operational state of the first subset of servers is online. Thus, the first subset of servers represents the "Frequently used servers" which are in an "online" operational state.

At block 508, the first subset of servers is ranked based on connectivity tests and network speed tests to obtain a ranked list of the first subset of servers. The ranked list of the first subset of servers may be grouped under the first category.

In an example, a second category may be identified for a second set of servers, from the plurality of servers, based on the second subset of attributes. The second category is indicative of a recommendation for connecting to the second set of servers based on an operational state of the second set of servers. The second set of servers are in an "online" operational state. Thus, the second category associated with a requested service includes a list of the available servers providing the requested service.

Figure 6:
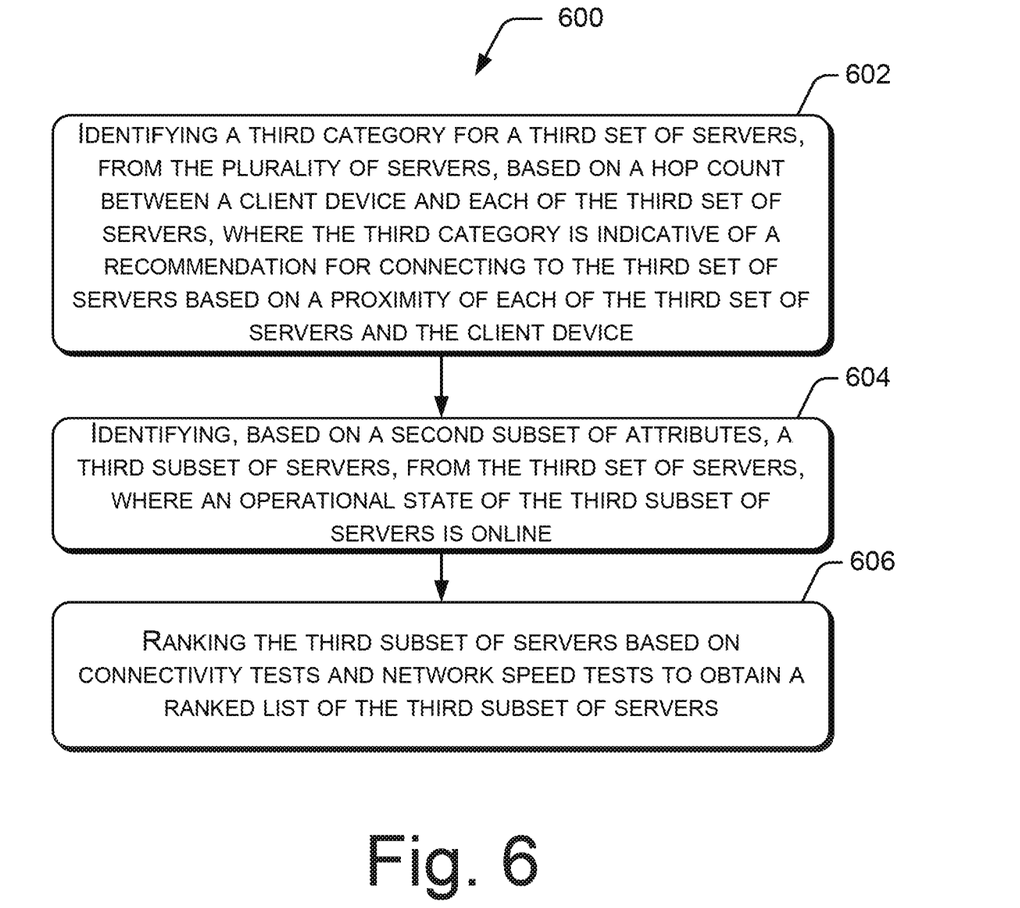
FIG. 6 illustrates a method for identification of a category for a server broadcasting a service, according to an example.

FIG. 6 illustrates a method 600 for identification of a category for a server broadcasting a service, according to an example. In an example, the category is a third category indicative of a recommendation for connecting to a third set of servers based on based on a proximity of each of the third set of servers and a client device. The method 600 may be executed by a network manager, such as the network manager 102 or 302. The method 600 can be implemented by processing resource(s) or computing device(s) through any suitable hardware, a non-transitory machine readable medium, or combination thereof. In an example, the method 600 may be performed by computer-readable instructions, such as the selection and categorization instruction(s) 314 which includes instructions stored on a medium and executable by a processing resource, such as the processor 106, of a network manager, such as the network manager 102 or 302. Further, although the method 600 is described in context of the aforementioned network manager 102 or 302, other suitable systems may be used for execution of the method 500. It may be understood that processes involved in the method 500 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

At block 602, the third category is identified for the third set of servers, from the plurality of servers, based on a hop count between a client device and each of the third set of servers. The third category is indicative of a recommendation for connecting to the third set of servers based on a proximity of each of the third set of servers and the client device.

At block 604, a third subset of servers is identified from the third set of servers, based on the second subset of attributes. The operational state of the third subset of servers is online. At block 606, the third subset of servers are ranked, based on connectivity tests and network speed tests to obtain a ranked list of the third subset of servers. In an example, the ranked list of the third subset of servers is grouped under the third category.

Figure 7:
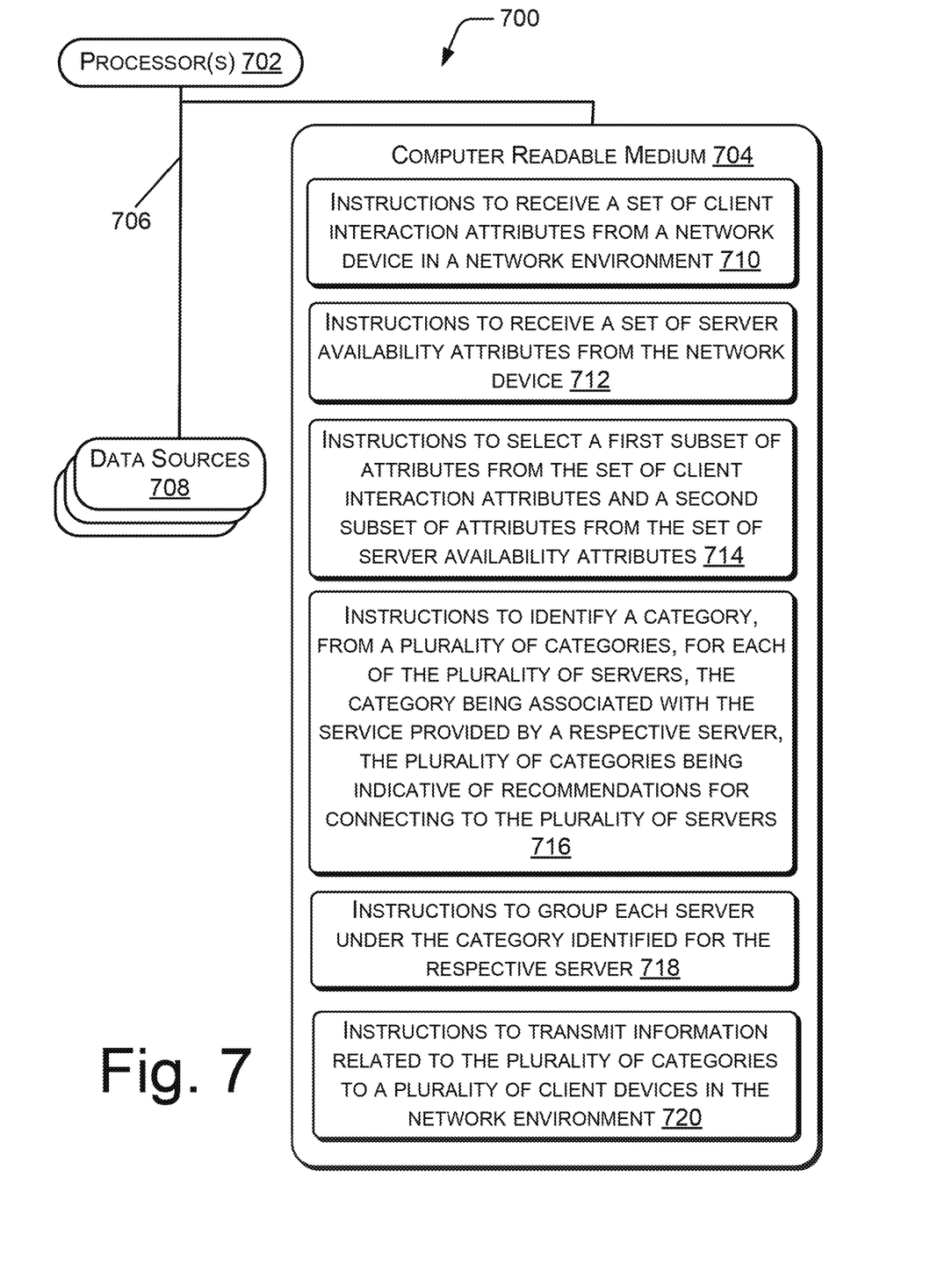
FIG. 7 illustrates a system environment implementing a non-transitory computer-readable medium for providing recommendations for connecting to servers broadcasting services, according to an example.

FIG. 7 illustrates a system environment 700 implementing a non-transitory computer-readable medium for providing recommendations for connecting to servers, according to an example. In an example, the system environment 700 includes processor(s) 702 communicatively coupled to a non-transitory computer-readable medium 704 through a communication link 706. In an example, the system environment 700 may be a network manager, such as the network manager 102 or 302. In an example, the processor(s) 702 may have one or more processing resources for fetching and executing computer-readable instructions from the non-transitory computer-readable medium 704.

The non-transitory computer-readable medium 704 can be, for example, an internal memory device or an external memory device. In an example implementation, the communication link 706 may be a direct communication link, such as any memory read/write interface.

The processor(s) 702 and the non-transitory computer-readable medium 704 may also be communicatively coupled to data sources 708 over the network. The data sources 708 can include, for example, memory of the system, such as the network manager 102 or 302.

In an example implementation, the non-transitory computer-readable medium 704 includes a set of computer-readable instructions which can be accessed by the processor(s) 702 through the communication link 706 and subsequently executed to perform acts for providing recommendations for connecting to servers.

Referring to FIG. 7, in an example, the non-transitory computer-readable medium 704 includes instructions 710 that cause the processor(s) 702 to receive a set of client interaction attributes from a network device in a network environment. The network device may be a switch, an access point, and a gateway. The network environment may be similar to the network environment 300. The set of client interaction attributes are indicative of a correlation between a client device, a service requested by the client device from a plurality of services, and a server, from a plurality of servers, which broadcasts the requested service. The plurality of servers may be broadcasted over the network environment using zero configuration networking protocols. Examples of the plurality of services include wireless streaming of multimedia content, remote login and remote management of smart devices, file sharing, video on demand, and wireless printing.

The non-transitory computer-readable medium 704 includes instructions 712 that cause the processor(s) 702 to receive a set of server availability attributes from the network device. The set of server availability attributes is indicative of an operational state of each of the plurality of servers.

The non-transitory computer-readable medium 704 includes instructions 714 that cause the processor(s) 702 to select a first subset of attributes from the set of client interaction attributes and a second subset of attributes from the set of server availability attributes. In an example, the first subset of attributes and the second subset of attributes are selected using wrapper-based machine learning techniques. Examples of the first subset of attributes include Media Access Control (MAC) addresses of a client device requesting a service and a server providing the service, Internet Protocol (IP) addresses of the client device and the server, service name of the requested service, an identification tag of the requested service, name of an access point to which the client device is connected, and name of an access point to which the server is connected.

The non-transitory computer-readable medium 704 includes instructions 716 that cause the processor(s) 702 to identify, based on at least one of the first subset of attributes and the second subset of attributes, a category, from a plurality of categories, for each of the plurality of servers. The category is associated with the service provided by a respective server. The plurality of categories is indicative of recommendations for connecting to the plurality of servers.

In an example, the non-transitory computer-readable medium 704 includes instructions that cause the processor(s) 702 to periodically transmit the first subset of attributes to an artificial intelligence (AI) engine. The instructions are executable by the processor(s) 702 to identify, based on predictions of the AI engine, a first category for a first set of servers, from the plurality of servers. The first category is indicative of a recommendation for connecting to the first set of servers based on a frequency of usage of the first set of servers. The instructions are executable by the processor(s) 702 further to identify, based on the second subset of attributes, a first subset of servers, from the first set of servers. The operational state of the first subset of servers is online. The instructions are executable by the processor(s) 702 further to rank, the first subset of servers based on connectivity tests and network speed tests to obtain a ranked list of the first subset of servers and to group the ranked list of the first subset of servers under the first category.

In an example, the non-transitory computer-readable medium 704 includes instructions that further cause the processor(s) 702 to identify, based on the second subset of attributes, a second category for a second set of servers, from the plurality of servers. The second category is indicative of a recommendation for connecting to the second set of servers based on an operational state of the second set of servers.

In an example, the non-transitory computer-readable medium 704 includes instructions that further cause the processor(s) 702 to identify a third category for a third set of servers, from the plurality of servers, based on a hop count between a client device and each of the third set of servers. The third category is indicative of a recommendation for connecting to the third set of servers based on a proximity of each of the third set of servers and the client device. The instructions are executable by the processor further to identify, based on the second subset of attributes, a third subset of servers, from the third set of servers, where an operational state of the third subset of servers is online. The instructions are executable by the processor further to rank, the third subset of servers based on connectivity tests and network speed tests to obtain a ranked list of the third subset of servers and to group the ranked list of the third subset of servers under the third category.

The non-transitory computer-readable medium 704 includes instructions 718 that cause the processor(s) 702 to group each server under the category identified for the respective server. The non-transitory computer-readable medium 704 includes instructions 720 that further cause the processor(s) 702 to transmit information related to the plurality of categories to a plurality of client devices in the network environment.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

I claim:

1. A method comprising:
    receiving, by a processor, a set of client interaction attributes from a network device in a network environment, the set of client interaction attributes being indicative of a correlation between a client device, a service requested by the client device from a plurality of services, and a server, from a plurality of servers, which broadcasts the requested service;
    receiving, by the processor, a set of server availability attributes from the network device, the set of server availability attributes being indicative of an operational state of each of the plurality of servers;
    selecting, by the processor, a first subset of attributes from the set of client interaction attributes and a second subset of attributes from the set of server availability attributes; and
    identifying, by the processor and based on at least one of the first subset of attributes and the second subset of attributes, a category, from a plurality of categories, for each of the plurality of servers, the category being associated with the service provided by a respective server, the plurality of categories being indicative of recommendations for connecting to the plurality of servers;
    wherein identifying the category comprises:
        periodically transmitting the first subset of attributes to an artificial intelligence (AI) engine;
        identifying, based on predictions of the AI engine, a first category for a first set of servers, from the plurality of servers, wherein the first category is indicative of a recommendation for connecting to the first set of servers based on a frequency of usage of the first set of servers;
        identifying, based on the second subset of attributes, a first subset of servers, from the first set of servers, wherein the operational state of the first subset of servers is online; and
        ranking, the first subset of servers based on connectivity tests and network speed tests to obtain a ranked list of the first subset of servers;
    grouping, by the processor, each server under the category identified for the respective server; and
    transmitting, by the processor, information related to the plurality of categories to a plurality of client devices in the network environment, wherein a client device of plurality of client devices use the information related to the plurality of categories to reduce a processing resource consumption of the client device.

2. The method as claimed in claim 1, wherein identifying the category comprises,
    identifying, based on the second subset of attributes, a second category for a second set of servers, from the plurality of servers, wherein the second category is indicative of a recommendation for connecting to the second set of servers based on an operational state of the second set of servers.

3. The method as claimed in claim 1, wherein identifying the category comprises:
    identifying a third category for a third set of servers, from the plurality of servers, based on a hop count between a client device and each of the third set of servers, wherein the third category is indicative of a recommendation for connecting to the third set of servers based on a proximity of each of the third set of servers and the client device;
    identifying, based on the second subset of attributes, a third subset of servers, from the third set of servers, wherein the operational state of the third subset of servers is online; and
    ranking the third subset of servers based on connectivity tests and network speed tests to obtain a ranked list of the third subset of servers.

4. The method as claimed in claim 1, wherein the first subset of attributes and the second subset of attributes are selected using wrapper-based machine learning techniques.

5. The method as claimed in claim 1, wherein the first subset of attributes comprises Media Access Control (MAC) addresses of a client device requesting a service and a server providing the service, Internet Protocol (IP) addresses of the client device and the server, service name of the requested service, an identification tag of the requested service, name of an access point to which the client device is connected, and name of an access point to which the server is connected.

6. The method as claimed in claim 1, wherein the second subset of attributes comprises MAC address and IP address of a server, from the plurality of servers, which is online, service name of a service broadcasted by the server, identification tag of the service, and name of an access point to which the server is connected.

7. The method as claimed in claim 1, wherein the plurality of services comprises wireless streaming of multimedia content, remote login and remote management of devices, file sharing, video on demand, and wireless printing.

8. The method as claimed in claim 1, wherein the plurality of services is broadcasted over zero configuration networking protocols.

9. A non-transitory computer-readable medium comprising computer-readable instructions, the computer-readable instructions when executed by a processor, cause the processor to:

receive a set of client interaction attributes from a network device in a network environment, the set of client interaction attributes indicative of a correlation between a client device, a service requested by the client device from a plurality of services, and a server, from a plurality of servers, which broadcasts the requested service;

receive a set of server availability attributes from the network device, the set of server availability attributes being indicative of an operational state of each of the plurality of servers;

select a first subset of attributes from the set of client interaction attributes and a second subset of attributes from the set of server availability attributes; and identify, based on at least one of the first subset of attributes and the second subset of attributes, a category, from a plurality of categories, for each of the plurality of servers, the category being associated with the service provided by a respective server, the plurality of categories being indicative of recommendations for connecting to the plurality of servers;

wherein identifying the category comprises:
periodically transmit the first subset of attributes to an artificial intelligence (AI) engine;
identify, based on predictions of the AI engine, a first category for a first set of servers, from the plurality of servers, wherein the first category is indicative of a recommendation for connecting to the first set of servers based on a frequency of usage of the first set of servers;
identify, based on the second subset of attributes, a first subset of servers, from the first set of servers, wherein the operational state of the first subset of servers is online; and
rank, the first subset of servers based on connectivity tests and network speed tests to obtain a ranked list of the first subset of servers;

group each server under the category identified for the respective server; and transmit information related to the plurality of categories to a plurality of client devices in the network environment, wherein a client device of plurality of client devices use the information related to the plurality of categories to reduce a processing resource consumption of the client device.

10. The non-transitory computer-readable medium as claimed in claim 9, wherein the computer-readable instructions to identify the category, when executed by the processor, further cause the processor to,
identify, based on the second subset of attributes, a second category for a second set of servers, from the plurality of servers, wherein the second category is indicative of a recommendation for connecting to the second set of servers based on an operational state of the second set of servers.

11. The non-transitory computer-readable medium as claimed in claim 9, wherein the computer-readable instructions to identify the category, when executed by the processor, further cause the processor to:
identify a third category for a third set of servers, from the plurality of servers, based on a hop count between a client device and each of the third set of servers, wherein the third category is indicative of a recommendation for connecting to the third set of servers based on a proximity of each of the third set of servers and the client device;
identify, based on the second subset of attributes, a third subset of servers, from the third set of servers, wherein an operational state of the third subset of servers is online; and
rank the third subset of servers based on connectivity tests and network speed tests to obtain a ranked list of the third subset of servers.

12. The non-transitory computer-readable medium as claimed in claim 9, wherein the first subset of attributes and the second subset of attributes are selected using wrapper-based machine learning techniques.

13. The non-transitory computer-readable medium as claimed in claim 9, wherein the plurality of services comprises wireless streaming of multimedia content, remote login and remote management of smart devices, file sharing, video on demand, and wireless printing.

14. The non-transitory computer-readable medium as claimed in claim 9, wherein the first subset of attributes comprises Media Access Control (MAC) addresses of a client device requesting a service and a server providing the service, Internet Protocol (IP) addresses of the client device and the server, service name of the requested service, an identification tag of the requested service, name of an access point to which the client device is connected, and name of an access point to which the server is connected.

15. The non-transitory computer-readable medium as claimed in claim 9, wherein the plurality of services is broadcasted over zero configuration networking protocols.

* * * * *